United States Patent [19]

Tawel

[11] Patent Number: 5,371,834
[45] Date of Patent: Dec. 6, 1994

[54] ADAPTIVE NEURON MODEL—AN ARCHITECTURE FOR THE RAPID LEARNING OF NONLINEAR TOPOLOGICAL TRANSFORMATIONS

[75] Inventor: Raoul Tawel, S. Pasadena, Calif.

[73] Assignee: The United States of America as represented by the Administrator of the National Aeronautics and Space Administration, Washington, D.C.

[21] Appl. No.: 937,335

[22] Filed: Aug. 28, 1992

[51] Int. Cl.$^5$ .................................... G06F 15/18
[52] U.S. Cl. .................................. 395/23; 395/21; 395/24; 395/25
[58] Field of Search ............... 395/23, 21, 22, 25

[56] References Cited

U.S. PATENT DOCUMENTS

| | | | |
|---|---|---|---|
| 4,897,811 | 1/1970 | Scofield | 395/21 |
| 4,914,708 | 4/1990 | Carpenter et al. | 395/23 |
| 4,990,838 | 2/1991 | Kawato et al. | 395/81 |

OTHER PUBLICATIONS

Computational Complexity Reduction for Neural Network Algorithms Allon Guez Apr. 1989 IEEE pp. 409–414.
Optimal Simulated annealing method and its application to combinatorial problems IEEE, Ikuo Matsura, IEEE, pp. 541–546.
Structural Stability of Unsupervised Learning in Feedback Neural Networks Bart Kosko IEEE, pp. 785–792 7 Jul. 1991.
M. Gherrity, A Learning algorithm for analog fully recurrent neural networks, IEEE 18–22 Jun. 1989 pp. 643–644.
A Stochastic High-Order Connectionist network for solving Interferencing problems, C. L. Masti, IEEE 18–21 Nov. 1991 pp. 911–916.
Learning of the Conlomb Energy Network on the variation of Temperature H. S. Choi, IEEE 7–11 Jun. 1992 pp. 749–754.
Neurocomputing R. H. Nielsen Addison-Wesley 1990 pp. 78–79; 164–167.
Richard P. Lippmann. An introduction to computing with neural network. IEEE ASSP magazine, pp. 4–22, 1987.
Jacob Barhen, Michael Zak, and Sandeep Gulati. Fast neural learning algorithms using networks with non–lipschitzian dynamics.
In Proceedings of Neuro-Nimes '89, 1989. Nimes, France.
Michael Zak. Terminal attractors for addressable memory in neural networks. Physical Letters A, 133:218–222, 1988.
John Moody and C Darken. Fast learning in neural networks of locally–tuned processing units. Neural Computation, 1 (2), 1989.
John Platt. A resource-allocating neural network for function interpolation. Neural Computation, 3(2), 1991.
Scott E. Fahlman and Christian Lebiere. The cascade-correlation learning architecture. In Advances in Neural Information Processing Systems, 1990. Denver, Colo.

(List continued on next page.)

Primary Examiner—Allen R. MacDonald
Assistant Examiner—Richemond Dorvil
Attorney, Agent, or Firm—John H. Kusmiss; Thomas H. Jones; Guy M. Miller

[57] ABSTRACT

A method and an apparatus for the rapid learning of nonlinear mappings and topological transformations using a dynamically reconfigurable artificial neural network is presented. This fully-recurrent Adaptive Neuron Model (ANM) network has been applied to the highly degenerative inverse kinematics problem in robotics, and its performance evaluation is bench-marked. Once trained, the resulting neuromorphic architecture was implemented in custom analog neural network hardware and the parameters capturing the functional transformation downloaded onto the system. This neuroprocessor, capable of $10^9$ ops/sec, was interfaced directly to a three degree of freedom Heathkit robotic manipulator. Calculation of the hardware feed-forward pass for this mapping was benchmarked at $\approx 10$ $\mu$sec.

18 Claims, 7 Drawing Sheets

OTHER PUBLICATIONS

Mark Holler, Simon Tam Hernan Castro, and Ronald Benson. An electrically trainable artificial neural network (etann) with 10240 'floating gate' synapses. In Proceedings of the IJCNN, 1989. Washington, D.C.

Raoul Tawel. Does the neuron 'learn' like the synapse. In Advances in Neural Information Processing Systems, vol. 1, San Mateo California, 1989. Morgan Kaufmann Publishers.

Raoul Tawel. Adaptive neurons for artificial neural networks. Applied Optics, 30:1000, 1991.

Michael I. Jordan. Supervised learning and systems with exces degrees of freedom. Technical Report 88-27, University of Massachusetts at Amerst, 1988.

A. Guez. Solution to the inverse kinematic problem in robotics by neural networks. In Proceedings of the 2nd International Conference on Neural Networks, 1988. San Diego, California.

Gary Josin. Neural-space generalization of a topological transformation. Biological Cybernetics, 59, 1988.

Jacob Barhen, Sandeep Gulati, and Michael Zak. Neural learning of inverse kinematics for redundant manipulators in unstructured environments. IEEE Computer, Jun., 1989.

Bartlett W. Mel. Murphy: A robot that learns by doing. In Neural Information Processing Systems, New York, NY, 1988. American Institute of Physics.

Raoul Tawel, Silvio Peter Eberhardt, and Anil P. Thakoor. Neural networks for robotic control. In Proceedings of Conference on Neural Networks for Computing, 1988. Snowbird, Utah.

Michael Kuperstein. Neural netork model for adaptive hand-eye coordination for single postures. Science, 239; 1308-1311, 1988.

Michael Kuperstein. Implementation of an adaptive neural controller for sensory-motor coordination. In Proceedings of the 2nd International Conference on Neural Networks, 1988. San Diego, California.

J S Albus. A new approach to manipulator control: the cerebeller model articulation controller (cmac). ASME journal of Dynamic Systems, Measurement, and Control, pp. 220-227, 1975.

W. Thomas Miller, Filson H. Glanz, and L. Gordon Kraft. Application of a general learning algoithm to the control of robotic manipulators. The International Journal of Robotic Research, 6, 1987.

W. Thomas Miller, Robert P. Hewes, Filson H. Glanz, and L. Gordon Kraft. Real time dynamic control of an industrial manipulator using a neural network based learning controller. IEEE Journal of Robotics and Automation, 1988.

Rolf Eckmiller, Jurgen Beckman, Heinz Werntges, and Martin Lades. Neural kinetics net for a redundant robot arm. In Proceedings of the 1st Joint Conference on Neural Networks, 1989. Washington D.C.

Raoul Tawel and Anil Prakash Thakoor. Neural network hardware solution to the inverse kinematic problem in robotics In Proceeding of the IEEE Third Annual Processing Symposium, 1989 Fullerton, California.

Silvio Peter Eberhardt, TuanDuong, and Anil Prakash Thakoor. A visi synapse 'building block' chip for hardware neural network implementations. In Larry H. Canter, editor, IEEE 3rd Annual Parallel Processing Symposium, 1989. Fullerton, California.

(List continued on next page.)

OTHER PUBLICATIONS

Fernando J. Pineda. Generalization of backpropagation to recurrent neural networks Phys. Rev. Lett, 18, 1987.

Fernando J. Pineda. Generalization of backpropagation to recurrent and higher order neural networks. In Proceedings of the Neural Information Processing Systems Conference, 1987.

John J. Craig. Introduction Robotic Mechanisms and Control. Addison–Wesley Publishing Co., REading, Massachusetts, 1986 pp. 113–151 2nd Edition.

Richard P. Paul. Robot Manipulators: Mathematics, Programming, and Control. MIT Press, Cambridge, Massachusetts, 1981. pp. 119–155.

William H. Press, Brian P. Flannery, Saul A. Teukolsky, and William T. Vetterling. Numerical recipes in C. The art of scientific computing. Cambridge University Press, Cambridge, England, 1988. pp. 85–91.

Alex Moopenn, Anil Prakash Thakoor, and Tuan Duong. Digital–analog hybrid neural simulator: A design aid for custom visi neurochips. In K. Bromley, editor, Proceedings of the SPIE Conference on High Speed Computing, 1989. Los Angeles, California.

Silvio Peter Eberhardt, Tuan Duong, and Anil Prakash Thakoor. Design of Parallel hardware neural network systems form custom analog visi building block chips. In Proceedings of the IJCNN, 1989. Washington, D.C.

Raoul Tawel and Anil P. Thakoor. Neural solutions to robotic control tasks and their hardware implementation. In Proceedings of the International Neural Network Society, 1988. Boston, Massachusetts.

Raoul Tawel. Learning in analog neural network hardware. In Proceedings of the Ascona workshop on industrial applications of neural networks, 1991. Ascona, Switzerland.

Silvio P. Eberhardt, Tuan Duong, Raoul Tawel, Fernando J. Pineda, and Anil P. Thakoor. A robotics inverse kinematics problem neural network hardware with gradient–descent learning. In Proceedings of IASTED International Conference on Expert Systems and Neural Networks, vol. 123, 1990. Honolulu, Hawaii.

ADAPTIVE NEURON MODEL—AN ARCHITECTURE FOR THE RAPID LEARNING OF NONLINEAR TOPOLOGICAL TRANSFORMATIONS

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to fully recurrent analog neural networks and in particular to apparatus and methods of training such networks by continuous updating of synapse weights and neuron temperatures.

2. Background Art

A problem that has remained consistently at the forefront of neural network research for the past several years, concerns the scalability of both neural networks architectures and their associated learning algorithms. Novel ideas for fast learning algorithms have surfaced in the literature, and include such formalisms as networks with non-Lipschitzian dynamics; terminal attractors; and locally-tuned processing units. There have also been significant developments in the area of dynamically reconfigurable neural network topologies for optimal use of processing assets. These include the resource allocating neural network (RANN) and the cascade correlation neural network (CCNN). However, the concern still remains that these approaches are geared toward 'small' problems that can be relatively easily implemented and trained in software within finite time on sequential digital computers. However, complex network architectures, which can model more realistic problems, often require specialized parallel hardware solutions as they prove to be otherwise frequently intractable computationally. Although such parallel hardware solutions are just beginning to emerge commercially, the problem of fast parallel on-chip or off-chip learning is still an issue. The fundamental problem in learning, therefore, is to further develop, refine and speed-up present learning algorithms which are capable of either extracting or memorizing the functional relationship linking the input-output data pairs of observations in a more rapid fashion. Of course the desire is to consequently use this information to predict the correct response to novel input patterns in real time.

In this specification, our initial focus is to develop the necessary mathematical formalism for a new connectionist learning architecture called the Adaptive Neuron Model (ANM) which has been designed to rapidly learn arbitrary, complex, nonlinear transformations from example. As the name of the model implies, the architecture allows both the synaptic and neuronal parameters to adapt. Training statistics indicate a considerable gain in training time is achievable. This model has been applied to a broad class of problems and has been shown to achieve functional synthesis on the training data. Of particular relevance to applications of the ANM model, is the class of problems commonly known as inverse mapping problems. These inverse problems are typically nonlinear, and are usually characterized by their one-to-many mapping operation. In other words, the specification of a goal does not uniquely determine the action that must be carried out to meet the task at hand. Such systems are said to be redundant or degenerate. This means that there can exist numerous if not an infinite number of distinct solutions for the system variables, whilst at the same time being entirely consistent with the desired task at hand.

Specifically, a problem that fits directly into this mold and has received much attention from the neural network community is that of the inverse kinematic problem for a robotic manipulator with excess degrees of freedom. It should be observed that biological systems handle such ill-defined or ill-structured problems such as sensorimotor control with remarkable ease and flexibility and reveal a spontaneous emergent ability that enables them to adapt their structure and function. This provides the motivation for recourse to biologically inspired paradigms for such problems. The inverse kinematic problem has been selected to benchmark the performance of the ANM learning algorithm. The inventor has previously addressed this same problem from the perspective of a feed-forward network employing the backpropagation algorithm, as disclosed in U.S. patent application Ser. No. 07/473,024 filed Jan. 31, 1990 by the present inventor and entitled "Neural Network with Dynamically Adaptable Neurons." The use of connectionist architectures is not limited to the inverse kinematic problem only. In fact neural networks have been used for (a) unsupervised adaptive visual-motor coordination of a multijoint arm where the system can learn sensory-motor control from experience, (b) dynamic control of manipulators based on the CMAC approach of Albus, and (c) the neural learning of the mapping transformation between desired trajectory formation and the corresponding actuator movement.

In selecting a neural network architecture, thought must also be given to the method for lifting the degeneracy problem present in these inverse mappings. Two distinct ways exist for achieving this. It can be accomplished with the introduction of constraints embedded a priori within the training set. This is the method which we pursue in this specification when forming the training set for the 3-link robotic manipulator. It may also be accomplished with the introduction of a penalty term within the energy function. The neural network is then trained to provide a solution that optimizes the penalty function p(x) that meets the specified constraints.

In order to illustrate these points, we borrow an example from linear algebra. Consider the problem of an under constrained system of equations of the unknown variable $\bar{x}$ of the form $A\bar{x}=\bar{b}$. Here, $\bar{b}$ is a constant vector quantity, and A is the matrix of constant coefficients. For an under-constrained system of equations, there is no possible way for determining a unique solution to $\bar{x}$ and in fact there exist an infinite number of solutions for it. Unique solutions can only be obtained by the introduction of an adequate number of constraints equation in the variable $\bar{x}$ so as to properly constrain the system.

In the last section of this specification, we report on an electronic implementation of the resulting neural network architecture that was put together from custom analog 'building block' neural network chips developed at the Jet Propulsion Laboratory. This electronic neuroprocessor has been interfaced with a commercially available Heathkit five degree of freedom robotic arm. In this example, the arm was constrained to motion in the vertical plane using three degrees of freedom out of a total of five available degrees. The electronic neuroprocessor was shown to be capable of guiding the manipulator along arbitrary trajectories in real-time.

SUMMARY OF THE INVENTION

The invention is a method an apparatus for the rapid learning of non-linear mappings and topological transformations using a dynamically reconfigurable artificial neural network is presented. This fully-recurrent Adaptive Neuron Model (ANM) network has been applied to the highly degenerate inverse kinematics problem in robotics, and its performance evaluation is benchmarked. Once trained, the resulting neuromorphic architecture was implemented in custom analog neural network hardware and the parameters capturing the functional transformation downloaded onto the system. This neuroprocessor, capable of $10^9$ ops/sec, was interfaced directly to a three degree of freedom Heathkit robotic manipulator. Calculation of the hardware feed-forward pass for this mapping was benchmarked at $\approx 10$ $\mu$sec.

The invention trains an analog neural network of plural neurons connected together by respective synapses, the neurons having respective activity states and adjustable neuron temperatures, the synapses having adjustable synapse weights, by defining, relative to an error between activity states of output ones of the neurons and a predetermined training vector, predetermined time-dependent behaviors of: (a) the activity states, (b) the neuron temperatures in accordance with a gradient descent of the error in temperature space and (c) the synapse weights in accordance with a gradient descent of the error in weight space. The behaviors are governed by (a) an activity state relaxation time, (b) a neuron temperature relaxation time and (c) a synapse weight relaxation time, respectively. The invention continuously updates the neuron activity states, the neuron temperatures and the synapse weights of the analog neural network at respective rates corresponding to the relaxation times until the error is reduced below a predetermined threshold. The activity state relaxation time is shorter than the neuron temperature relaxation time and shorter than the synapse weight relaxation time, whereby for a given set of values of the neuron temperatures and synapse weights, the neuron activity states equilibrate before changes in the set of values occur. In the preferred embodiment of the invention, each behavior is a corresponding differential equation for each neuron. The behavior of the activity states is an activity state differential equation for each neuron defining the time derivative of the corresponding activity state in terms of a product of the corresponding neuron temperature multiplied by the sum of products of corresponding ones of the synapse weights and corresponding ones of the activity states. The continuously updating includes solving the activity state differential equation for the activity state repetitively at a rate corresponding to the activity state relaxation time. The behavior of the neuron temperatures is a temperature differential equation for each neuron defining the time derivative of the corresponding neuron temperature as a product of an exponential function of the neuron temperature and the error transformed by a matrix of the synapse weights. The continuously updating further includes solving the temperature differential equation for the neuron temperature repetitively at a rate corresponding to the temperature relaxation time. The behavior of the synapse weights is a weight differential equation for each synapse defining the time derivative of the corresponding synapse weight as a product of an exponential function of the corresponding neuron temperature and a sum of products of the synapse weights. The continuously updating further includes solving the weight differential equation for the synapse weight repetitively at a rate corresponding to the weight relaxation time. The differential equations are solved in an order of ascending relaxation times. The invention employs the results of the solving of a previous differential equation in solving a next differential equation.

DETAILED DESCRIPTION OF THE INVENTION

Adaptive Neuron Model

The basic premise behind the Adaptive Neuron Model is that the neurons should be allowed to actively participate in the learning process. Prior neuromorphic models regarded the neuron as a strictly passive nonlinear element and the synapse as the primary source of knowledge capture and information retention. In this section, we develop the necessary mathematical formalism for the Adaptive Neuron Model. This is a fully recurrent extension of earlier work done by the inventor described in the above-referenced patent application. The dynamics of a neural network consisting of a system of N interacting neurons is specified by the set of N coupled nonlinear differential equations. These are given by:

$$\frac{dx_i}{dt} = -x_i + g_i\left(\beta_i\left[\sum_{j=1}^{N} w_{ij}x_j + I_i\right]\right) \quad (1)$$

where $x_i$ represents the activity of the $i^{th}$ neuron in a system of N interacting neurons and is bound on the interval [0,1]; where $w_{ij}$ is the inter-neuron coupling coefficient (or connection strength) and is direction sensitive in the sense that $w_{ij}$ is directed from the $j^{th}$ neuron to the $i^{th}$ neuron; where the constant $I_i$ represents the external stimulus received by the $i^{th}$ neuron; where $\beta_i$ is the inverse of the temperature of the $i^{th}$ neuron, and is a local parameter expressed as $\beta_i = T_i^{-1}$. The function $g_i()$ is a nonlinear function, and the only restriction in choosing this function is that it be differentiable. There are several popular choices for $g_i()$, however two commonly used forms include the logistic function and the gaussian local response function. These are given by:

$$g_i(u) = \begin{cases} (1 + e^{-\beta u})^{-1} & \text{logistic function} \\ \alpha e^{-\gamma u^2} & \text{gaussian function} \end{cases} \quad (2)$$

and where $\alpha$, $\beta$, and $\gamma$ are constants that modify the shape of these nonlinear response functions. In the following derivation, we shall make reference to the popular logistic function to illustrate the formalism. Extension to other response functions is direct. The state of this dynamical system can be uniquely defined in the following manner. For a system of N interacting neurons, the collective activity of the system i.e., ($x_i$, all i $\epsilon\{1,N\}$) defines a unique point, and hence state, in an N dimensional unit cube. The unit cube restriction comes from the boundary conditions imposed on the variables $x_i$ in Equation 1. For the sake of the argument, if we consider the adiabatic response of the system, i.e. where both the synaptic weights and the neuronal temperatures remain quasi-static, then the temporal evolution of the system may then be viewed as a continuous path in this N-dimensional unit cube of activity. The dissipative nature of the differential equation ensures that for a given set of initial conditions, as given by the vector $\vec{x}^i$, external stimulus $\vec{I}$ and the weights matrix W, the system will ultimately relax into a final state which we denote by $\vec{x}^f$. In the following derivation, we use the convention where vectors, vector components and matrix components are denoted by lower case letters with the appropriate number of indices, and matrices are correspondingly denoted by upper case letters. During training, two other spaces are of relevance. First, there is the N×N dimensional space covering the real valued synaptic elements ($w_{ij}$, all i,j $\epsilon\{1,N\}$). An N×N-dimensional point in this space uniquely defines the weight state of the system. Furthermore, there is now an additional N-dimensional positive real valued space ($\beta_i$, all i $\epsilon\{1,N\}$) spanning all possible combinations of the neuronal temperature parameters. Specific considerations on physically meaningful or allowable values for neuronal parameters have to be made. For the logistic function in Equation 1, it makes no sense considering negative $\beta_i$ temperatures. A point in this N dimensional space therefore uniquely specifies the state of the neurons. Fully-recurrent algorithms already exist that will adjust the synaptic weight matrix W so that a given initial state $\vec{x}^i$, and a given input vector $\vec{I}$ result in a fixed point $\vec{x}^f$ whose components have the desired set of target values $\eta_j$ along the output units. This is accomplished by minimizing a function E (the so-called energy function) which measures the distance between the desired fixed point and the actual fixed point over the entire training set. For M output units, this function is given by:

$$E = \tfrac{1}{2}\sum_{i=1}^{M}(\eta_i - x_i)^2 \quad (3)$$

The function E depends on the weight matrix W through the fixed points, i.e. $\vec{x}^f(w_{ij})$. A learning algorithm must therefore be capable of driving the fixed points towards the manifolds which satisfy $x_i = \eta_i$ on the output units. This is accomplished dynamically by allowing the system to evolve in the weight space along trajectories which are antiparallel to the gradient of E. In other words, $$\tau_w \frac{dw_{rs}}{dt} = -\frac{\partial E}{\partial w_{rs}} \quad (4)$$

where $\tau_w$ is a numerical constant which defines the relatively slow time scale for solving these differential equations for the weights. The reason for $\tau_w$ to be long arises from the requirement that the dynamical system given by Equation 1 must always be at a steady state. In other words, if we let the numerical constant $\tau_x$ defines the time scale on which the dynamical system relaxes, then $\tau_x << \tau_w$, and implies that the system of Equations 1 relax on a time scale where it would appear that the weights are static, i.e. stationary. In the following section, a similar formalism is derived for the neuronal parameters.

0.1 Neurodynamical formalism

Figure 1:
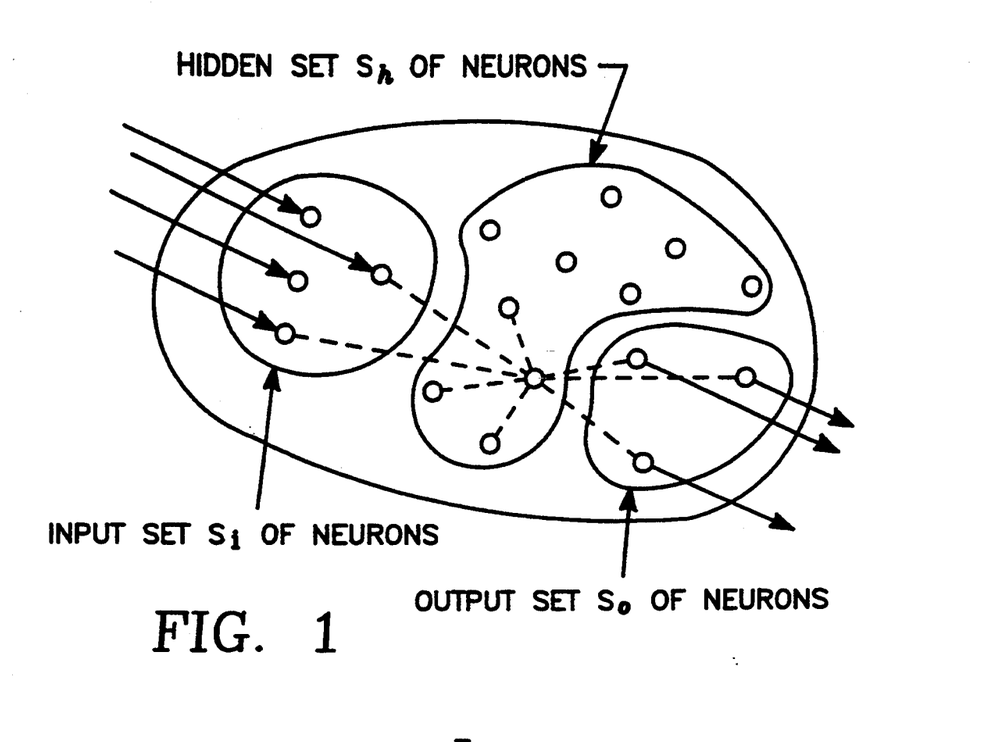
FIG. 1 illustrates the network topology and connectivity of a fully recurrent neural network included in the invention.

In this section, the general overview described above is formalized into a mathematical framework which fuses together into one fully recurrent formalism, both synaptic weight matrix learning (as proposed and developed by Pineda and neuronal temperature learning. Therefore, in addition to the system of differential equations given by Equations 1 and 4, our goal is to find a local algorithm which adjusts the temperature vector $\vec{\beta}$ of the neurons so that for a given initial state $\vec{x}^i$, external stimulus $\vec{I}$, and weight matrix W, the system relaxes into the desired point attractor structure. The specific method selected by the inventor for accomplishing this task is to allow the system to evolve in the temperature space along trajectories which are anti-parallel to the gradient of the error function E given in Equation 3. In other words, $$\tau_\beta = \frac{d\beta_r}{dt} = -\frac{\partial E}{\partial \beta_r} \quad (5)$$

where $\tau_\beta$ is a numerical constant that defines the time scale on which the neuronal temperatures $\vec{\beta}$ changes. Again, the time scale selected for $\tau_\beta$ is relatively long, i.e. $\tau_x << \tau_\beta$. The reasons for this inequality is similar to that described above for the weight updates. During the relaxation of the dynamical system into its attractor structure, (in accordance with Equation 1), all parameters including the synaptic weights and neuronal temperatures must be static. Therefore, the weights and temperature update time scales can be chosen to have similar time scales, i.e. $\tau_b \simeq \tau_w$. Consider again the system of N interacting neurons. Of the various neurons in this network, there will exist three subsets: an input set, an output set, and a hidden set of neurons. The hidden set of neurons are those that are not connected to the outside world. A representation of this neural network topology is given in FIG. 1.

As was stated earlier, the dynamics of the system of N interacting neurons is determined by Equation 6.

$$\frac{dx_i}{dt} = -x_i + g_i\left(\beta_i\left[\sum_{j=1}^{N} w_{ij}x_j + I_i\right]\right) \tag{6}$$

Let us now find the local algorithm which will adjust the temperature vector $\vec{\beta}$. It was stated earlier that one way of accomplishing this was to let the neuron temperatures evolve in temperature space along trajectories which are anti-parallel to the gradient of the error function given in Equation 3. In other words, $$\tau_\beta \frac{d\beta_r}{dt} = -\frac{\partial E}{\partial \beta_r} \tag{7}$$

This choice of gradient descent has the simplest dynamics which minimizes E. On performing the differentiation in Equation 7 one immediately obtains $$\tau_\beta \frac{d\beta_r}{dt} = \sum_{i=1}^{N} (\eta_i - x_i^f)\frac{\partial x_i^f}{\partial \beta_r} \tag{8}$$

The partial derivative of $x_i^f$ with respect to $\beta_r$ is obtained by noting that the fixed points of Equation 6 satisfy the nonlinear algebraic equation $$x_i^f = g_i\left(\beta_i\left[\sum_{j=1}^{N} w_{ij}x_j + I_i\right]\right) \tag{9}$$

Taking the partial derivative of this equation with respect to $\beta_r$ results in the following expression, where the right hand term is simply the result of the chain rule, $$\frac{\partial x_i^f}{\partial \beta_r} = g_i'\left\{\left(\sum_{j=1}^{N} w_{ij}x_j + I_i\right)\frac{\partial \beta_i}{\partial \beta_r} + \beta_i\left(\sum_{j=1}^{N} w_{ij}\frac{\partial x_j}{\partial \beta_r}\right)\right\} \tag{10}$$

But the partial differential on the left hand side of Equation 10 can be expressed as a summation over all neurons by using the Kronecker delta function, $$\frac{\partial x_i^f}{\partial \beta_r} = \sum_{j=1}^{N} \delta_{ij}\frac{\partial x_j^f}{\partial \beta_r} \tag{11}$$

where $\delta_{ij}=1$ iff $i=j$. Substituting Equation 11 into equation 10 and regrouping terms, $$\sum_{j=1}^{N} [\delta_{ij} - \beta_i g_i' w_{ij}]\frac{\partial x_j^f}{\partial \beta_r} = g_i'\delta_{ir}\left[\sum_{j=1}^{N} (w_{ij}x_j + I_i)\right] \tag{12}$$

Let us define the matrix M whose components are given by $$M_{ij} = \delta_{ij} - \beta_i g_i' w_{ij} \tag{13}$$

Then Equation 12 can be rewritten as $$\sum_{j=1}^{N} M_{ij}\frac{\partial x_j^f}{\partial \beta_r} = \delta_{ir}g_i'(u_i^f)u_i \tag{14}$$

But since we want to solve for the partial derivative of $x_j^f$ with respect to the temperature parameter $\beta_r$, the matrix M in equation (14) must be inverted $$\frac{\partial x_j^f}{\partial \beta_r} = (M^{-1})_{jr}g_r(u_r^f)u_r^f \tag{15}$$

Substituting Equation 15 into Equation 8 results in the following expression $$\tau_\beta \frac{d\beta_r}{dt} = \left[g_r(u_r^f)\sum_{j=1}^{N} J_j(M^{-1})_{jr}\right] \tag{16}$$

Let us define the vector quantity $\vec{y}$ to be a vector quantity whose component is equal to the expression contained within the brackets in Equation 16, i.e.

$$y_r^f = \left[g_r'(u_r^f)\sum_{j=1}^{N} J_j(M^{-1})_{jr}\right] \tag{17}$$

Then the differential equations governing the rate of change of the temperature $\beta_r$ can be expressed as $$\tau_\beta \frac{d\beta_r}{dt} = y_r^f u_r^f \tag{18}$$

The problem is that in Equation 15, the calculation of the matrix inverse is anon-local operation. Pineda showed a methodology for working around this problem. Consider again Equation 17, and regroup the terms, i.e.

$$\sum_{j=1}^{N} J_j(M^{-1})_{jr} = \left(\frac{y_r^f}{g_r'(u_r^f)}\right) \tag{19}$$

Equation 19 can be rearranged into the following expression $$0 = -\sum_{k=1}^{N} M_{rk}\left(\frac{y_k^f}{g_k'(u_k^f)}\right) + J_r \tag{20}$$

Let us further define the vector quantity $\vec{z}$ to be the quantity in brackets in Equation 20.

$$z_k^f = \left(\frac{y_k^f}{g_k'(u_k^f)}\right) \tag{21}$$

But Equation 21 is a stable solution of the following differential equation $$\frac{dz_r}{dt} = -\sum_{k=1}^{N} M_{rk}z_k + J_r \tag{22}$$

which can be easily solved. This leads to the following expression where we introduce timescales:

$$\tau_z \frac{dz_r}{dt} = -\left(\sum_{k=1}^{N} M_{rk}z_k\right) + J_r \quad (23)$$

and formulates all the necessary neuronal learning equations. For the system to learn, it is necessary for the time scales to be properly selected. The dynamical equations with explicit time scales are given as follows:

$$\tau_x \frac{dx_i}{dt} = -x_i + g_i\left(\beta_i\left[\sum_{j=1}^{N} w_{ij}x_j + I_i\right]\right) \quad (24)$$

$$\tau_\beta \frac{d\beta_r}{dt} = y_r'u_r^f \quad (25)$$

$$\tau_z \frac{dz_r}{dt} = -\sum_{k=1}^{N} M_{rk}z_k + J_r \quad (26)$$

$$\tau_w \frac{dw_{rs}}{dt} = v_r'x_s^f \quad (27)$$

$$\tau_v \frac{dv_r}{dt} = -v_r + g_r'(u_r^f)\left\{\sum_{i=1}^{N} w_{ir}v_i + J_r\right\} \quad (28)$$

The relaxation time scale for the forward propagation is $\tau_x$.

Equations 27 and 28 are taken from prior techniques based upon updating the synapse weights only.

The relaxation timescale for the backward propagation is $\tau_v$. The weight adaptation time scale is given by $\tau_w$. The adaptation time scale for the neuronal parameters is $\tau_\beta$. It is straightforward to establish the relationships which must be satisfied by the characteristic time scales of the system. Recall that an a-priori requirement is that the system parameters w and I change adiabatically. This condition alone constrains the relative time scales.

WORKING EXAMPLE

A robotic manipulator may be thought of as a set of interconnected chain elements called links. Links are connected to one other via joints, of which one such joint is the revolute joint. Joints are characterized by their having a single degree of freedom. Therefore, for an n joint manipulator, the static state of system is entirely specified by an n-element vector, whose components provide a measure of the relative deflection of the two connecting linkages. Kinematics is the science of motion that deals with the geometrical description of these linkages. It is not to be confused with dynamics in that no reference is made to the forces and torques required to cause these joint to move. Kinematics therefore involves coordinate transformations between frames attached to the joints, whose variables include joint positions, velocities, accelerations, and all higher temporal and spatial derivatives of the joint variables. For an n degree of freedom manipulator, the n dimensional space swept by all possible joint vectors is defined as the joint space. The direct kinematics problem requires the computation of the Cartesian state description of the end-effector from knowledge of the joint state description. The direct kinematics calculation for a manipulator is a one-to-one transformation and consequently the major expense in calculating kinematics is often the repeated calculation of the transcendental functions.

0.2 Inverse Kinematics

A fundamental motion control task in the hierarchy of robotic tasks necessary to operate a robotic manipulator is the inverse kinematics problem. It is based on a non-linear inverse mapping that involves the geometrical structure of the robot manipulator. Let us consider a robotic arm whose base is centered at the origin of some Cartesian frame of reference. In this specification motion is restricted to 2-D.

Any point in this space is completely specified by three orthogonal translations from the origin. Consequently, a rigid body requires at least three coordinates to specify its position and orientation relative to this origin. The inverse kinematics problem is the transformation between the Cartesian coordinate system and the coordinate system particular to the robot manipulator, i.e. the joint space. In other words, if we specify a Cartesian location for the robot's end-effector, we must determine the set of joint angles required by the robot to accomplish this task. The importance of this problem becomes clear when one considers that for the end-effector to achieve a desired trajectory in Cartesian space, one must determine how the joint angles vary with time along the entire trajectory. The transformation between Cartesian space and the joint space depends on the manipulator's geometry, and most geometries lack a closed form solution to the inverse kinematics problem. Typically, an iterative search method must be implemented to perform this transformation. Furthermore, an added complication arises when redundant manipulators can reach the same end-effector position and orientation via many possible configurations. This poses the additional problem of selecting the optimal set of joint angles when a trajectory passes through a region of multiple solutions.

Figure 2:
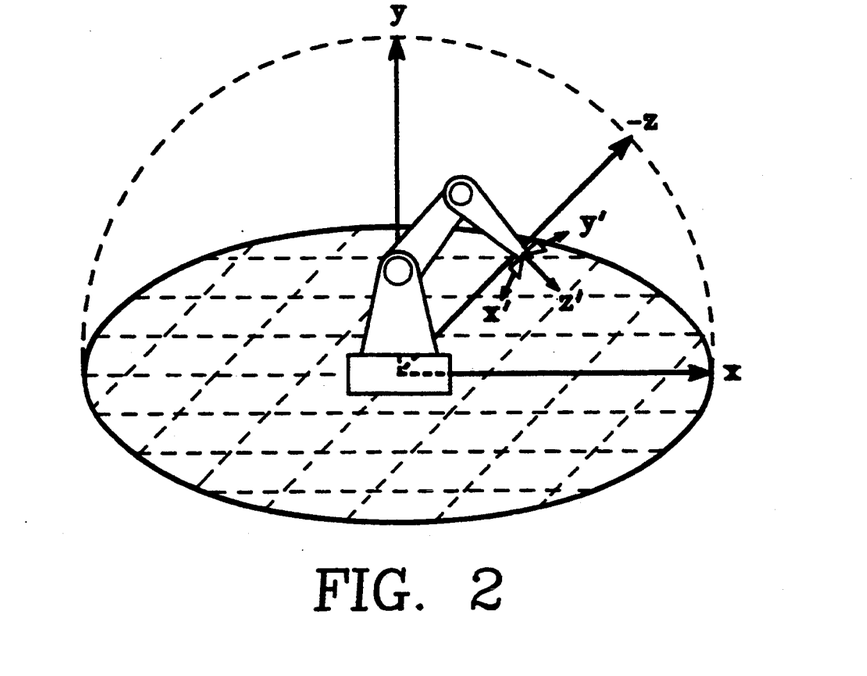
FIG. 2 illustrates a robotic arm employed in carrying out one application of the invention.
Figure 3:
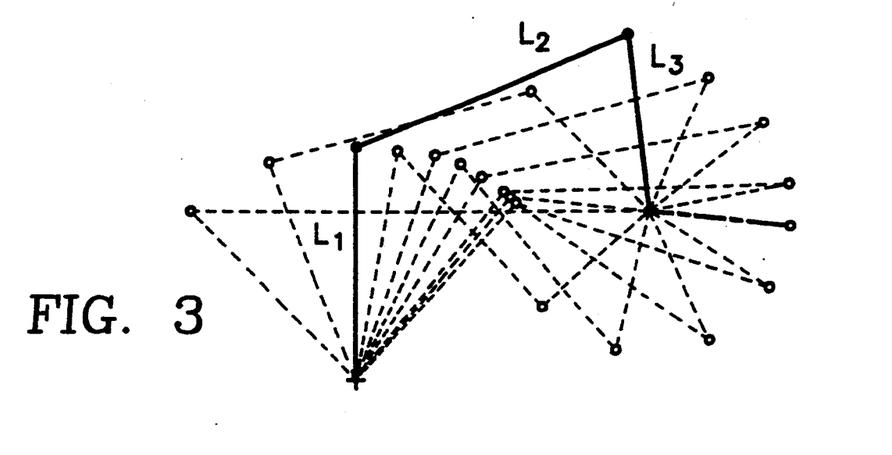
FIG. 3 illustrates the degeneracy problem for a robot manipulator solved by the invention.

In this specification we have considered a 3-degree of freedom manipulator moving in a 2-dimensional space, and have targeted both the inverse kinematics problem and the closely associated problem of trajectory generation as representative tasks for a connectionist approach and for a hardware based neural implementation. FIG. 3 shows the degenerate 3-link robotic arm and FIG. 2 shows the arm and its workspace envelope. It is centered at (0,0), where its links are constrained to move in the x-y plane. Points within this planar workspace bound by the first and fourth quadrant of the x-y plane, constitute valid Cartesian coordinates for the end-effector. As stated above, the inverse kinematics problem deals with the transformation from the 2-dimensional Cartesian space (x,y) describing the manipulators environment to the 3-dimensional joint space $(\theta_1,\theta_2,\theta_3)$ describing the posture of the robotic manipulator. Points within the workspace, (x,y) can be reached by the arm only by specifying the associated set of joint angles. The transformation f: $(x,y) \rightarrow (\theta_1,\theta_2,\theta_3)$ defines the inverse kinematics problem.

0.3 Training Set Formation

Figure 4:
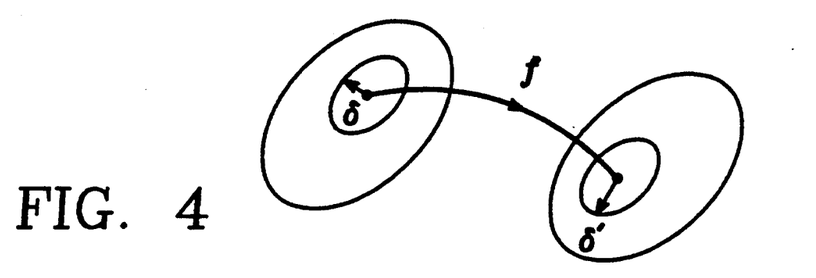
FIG. 4 illustrates the smoothness criteria for a transformation employed in robotic kinematics emulated by the invention.

Within the neuromorphic framework, the solution of the inverse kinematic problem involves two phases. These are the training phase and the recall phase. It is the purpose of the training phase to encode within the network's synaptic weights and neuronal parameters the inverse mapping. Great care must be taken to generate an appropriate set of training samples that capture the essential characteristics of the mapping from the task space of the end-effector to its joint space. The need for a careful selection of the training set becomes clear for the following reason. Consider a point well within the planar workspace. Since the problem for the three link uni-planar arm is degenerate, there is an infinity of valid arm configurations for each such training point we select in the workspace. Continuity conditions, however, require that in the absence of external conditions (such as obstacles) that the non-linear mapping operation should reflect the nearness of Cartesian points (in task space) to a corresponding nearness in joint angles (in joint space). This functional nearness is shown in FIG. 4. If the training set is selected with this proviso in mind, then what the neural network captures is a smooth transformation linking the two spaces. This method allows us to imbed the constraints peculiar to the system via an appropriate choice of a training set and at the same time a priori lift the degeneracy inherent in the problem.

Figure 5:
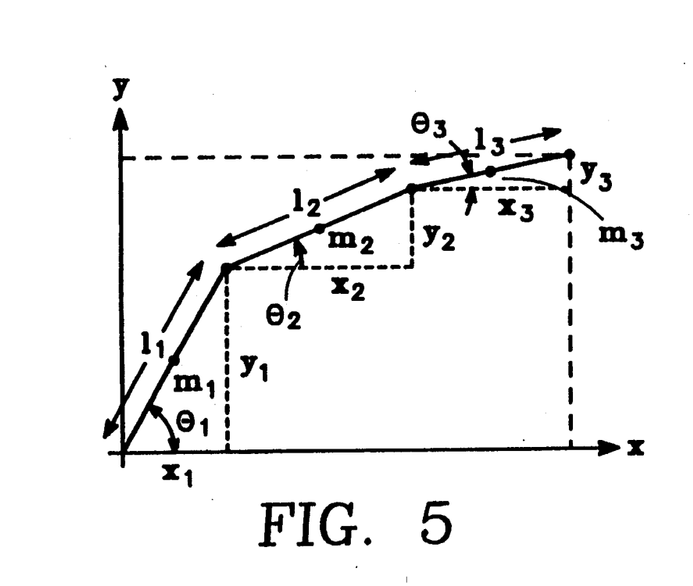
FIG. 5 illustrates the reductions of a robotic system to a 3 link kinematic chain emulated by the invention.

There are numerous methods for generating a training set consistent with the smoothness criteria which at the same time will lift the degeneracy. The method used in this specification is borrowed from the statics and dynamics of mechanical structures. It is based upon the observation that a catenary chain assumes a unique configuration in the presence of the gravitational field. A catenary chain is a continuous cable characterized by a mass-per-unit-length term. For arbitrary positions of the two ends of the chain, the system always assumes a unique equilibrium configuration. In the discrete approximation to the chain, we consider the 3-link robotic arm as a 3-link chain. Each link having a length term $l_i$ and a mass term $m_i$ through which it couples with the external gravitational field g. Furthermore, to make the semblance to a robotic system more realistic, one end of the chain is attached to the origin of our system, while the other end is allowed to move freely about the first and fourth quadrants defining the workspace. The 3-link system is shown in FIG. 5. Each element is assigned both a length term $l_i$ and a mass term $m_i$. Coupling of the chain mass to the gravitational field lifts the degeneracy by uniquely specifying an arm configuration consistent with the extremum of the energy of the system. The above discussion allows us to formulate the problem. Referring to FIG. 5, the potential energy of the system composed of the three links is given by:

$$V(\theta_1,\theta_2,\theta_3)=c_1 \sin \theta_1+c_2 \sin \theta_2+c_3 \sin \theta_3 \quad (29)$$

where the constants $c_i$ are functions of the link mass and length terms, and are given by:

$$c_1=gl_1(0.5m_1+m_2+m_3) \quad (30)$$

$$c_2=gl_2(0.5m_2+m_3) \quad (31)$$

$$c_3=gl_3(0.5m_3) \quad (32)$$

This system is subject to physical constraints which describe that the sum of the spatial Cartesian components must equal the end-effector position, i.e., $$\phi_1(\theta_1,\theta_2,\theta_3)=l_1 \cos \theta_1+l_2 \cos \theta_2+l_3 \cos \theta_3-x \quad (33)$$

$$\phi_2(\theta_1,\theta_2,\theta_3)=l_1 \sin \theta_1+l_2 \sin \theta_2+l_3 \sin \theta_3-y \quad (34)$$

We must now determine the extremum of the function V $(\theta_1,\theta_2,\theta_3)$. Because of the nonlinearity of the equations involved, substitution of the constraint equations into V (so as to reduce V to a function of a single independent variable) is not possible. The use of Lagrangian multipliers is therefore required. Accordingly, we consider the augmented function given by $$\bar{V}=V+\lambda_1\phi_1+\lambda_2\phi_2 \quad (35)$$

For the function V to attain an extremum, a necessary and sufficient condition requires that $$\frac{\partial V}{\partial \theta_i} + \sum_{k=1}^{2} \lambda_k \frac{\partial \phi_k}{\partial \theta_i} = 0 \quad (36)$$

This leads to the set of five simultaneous equations in five unknowns, i.e. the three joint variables and the two Lagrange multipliers.

$$c_1 \cos \theta_1-\lambda_1 l_1 \sin \theta_1+\lambda_2 l_1 \cos \theta_1=0 \quad (37)$$

$$c_2 \cos \theta_2-\lambda_1 l_2 \sin \theta_2+\lambda_2 l_2 \cos \theta_2=0 \quad (38)$$

$$c_3 \cos \theta_3-\lambda_1 l_3 \sin \theta_3+\lambda_2 l_3 \cos \theta_3=0 \quad (39)$$

$$l_1 \cos \theta_1+l_2 \cos \theta_2+l_3 \cos \theta_3-x=0 \quad (40)$$

$$l_1 \sin \theta_1+l_2 \sin \theta_2+l_3 \sin \theta_3-y=0 \quad (41)$$

Figure 6:
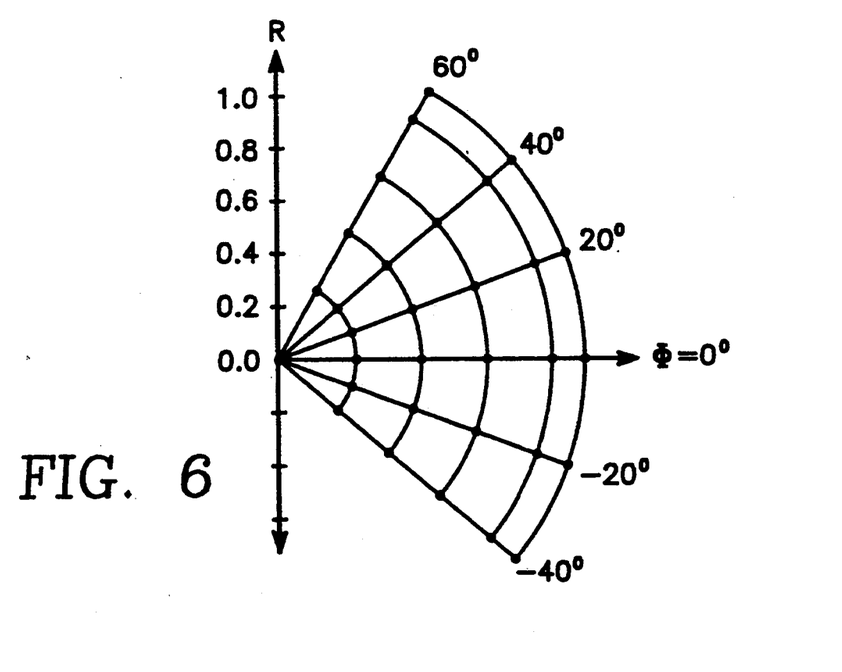
FIG. 6 illustrates a cartesian end effector space selected for training the network in accordance with the invention.
Figure 7:
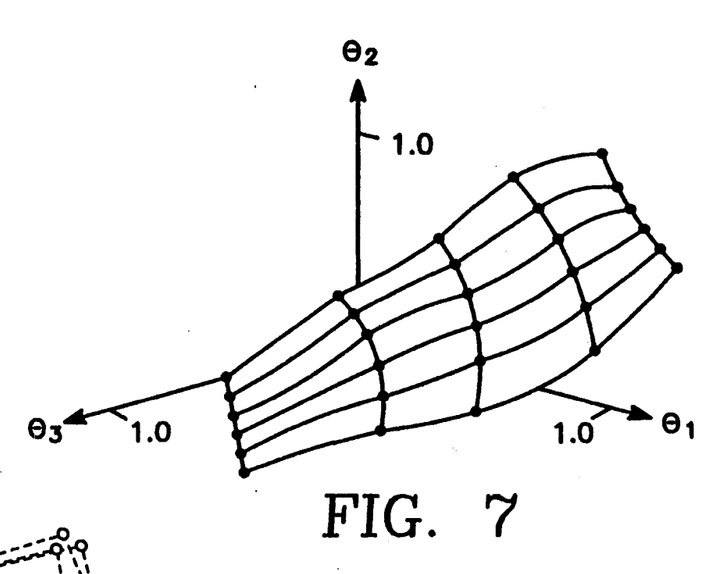
FIG. 7 illustrates the joint space spanned by three joint angles emulated by the invention.

The Newton-Raphson iteration technique was utilized to find the roots of this system of nonlinear equations. A minor problem with this approach is that good starting values are required for the algorithm to converge. The technique we employed was to divide-up the reachable workspace into a cellular grid. A cell was selected for which the joint angles could easily be guessed/determined, (i.e. extended arm along the x-axis), and the Newton-Raphson method was used to determine the Lagrange multipliers for that cell. Because of the continuity condition we imposed earlier, we expect that the determination of these angles and multipliers for a given cell provide good starting values for contiguous neighboring cells. In this way, we can obtain the angles necessary to form the training set. A significant subspace of the manipulator's total reachable workspace was chosen over which to train the neural network. Thirty Cartesian end-effector positions uniformly spanning this subspace were selected and are shown in FIG. 6. These serve as the input elements of the training pairs. Thirty points uniformly span this space. Points selected were chosen to lie on a polar grid. Both the abscissa and ordinate are normalized on [0,1]. The output space, spanned by $(\theta_1,\theta_2,\theta_3)$, corresponding to the thirty points in FIG. 6 are shown in FIG. 7. It is important to note that the space spanned by the Cartesian coordinates maps onto a smooth manifold in joint space. This guarantees that the continuity condition is met and that the neural network will be capable of generalizing beyond the training set. FIG. 7 illustrates the joint space spanned by the three joint angles $(\theta_1,\theta_2,\theta_3)$. These thirty points correspond to the transformation of the corresponding points in Cartesian (x,y) pairs in the previous figure.

0.4 Network Architecture

Figure 8:
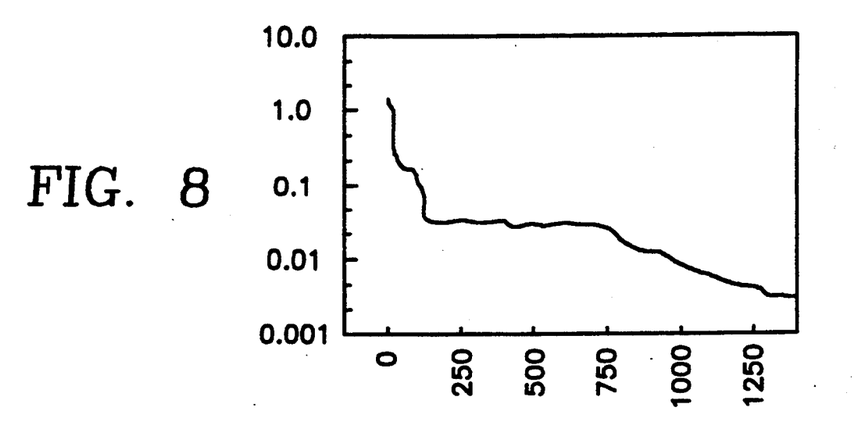
FIG. 8 is a graph illustrating the training statistics of a neural network embodying the invention.
Figure 9:
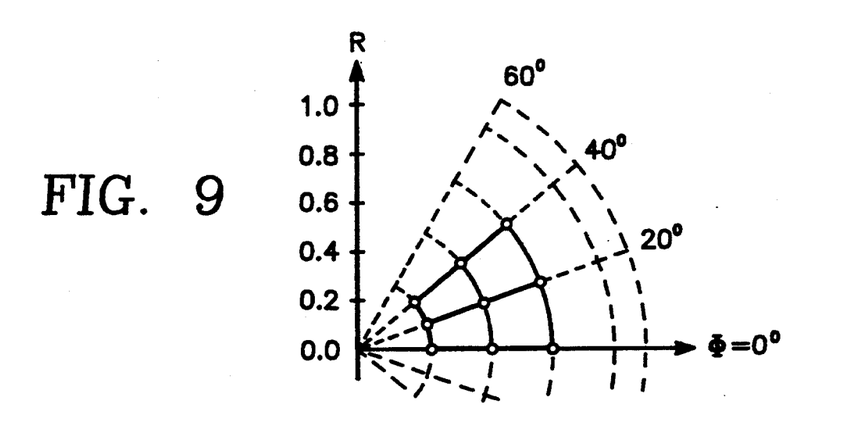
FIG. 9 is a graph illustrating the performance of a neural network embodying the invention on a training set.
Figure 10:
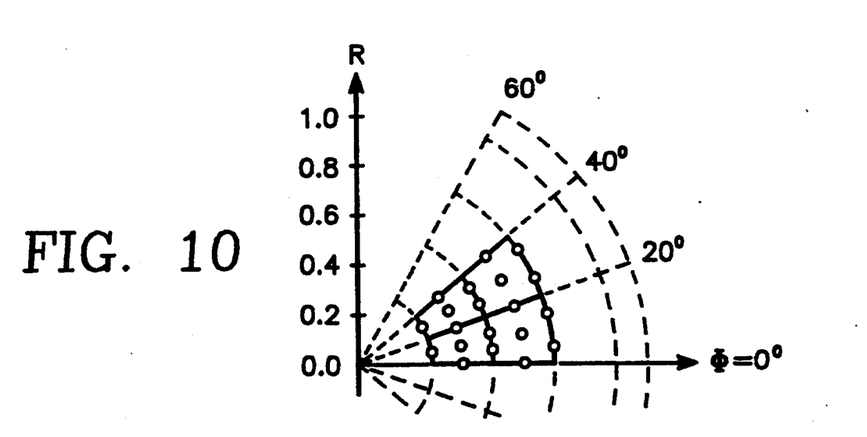
FIG. 10 is a graph illustrating the performance of a neural network embodying the invention on untrained examples.

Once the training set is selected, the next task is to apply the Adaptive Neuron Model formalism to the training data so as to capture the embedded inverse transformation of the 3-link inverse kinematic chain. The network is arranged into three sets of non-linear processing units; an input set, a hidden set, and an output set. Continuously variable synaptic weights $w_{ij}$ connect units from layer to layer within the network and positive real valued temperatures $\beta_i$ characterize the neurons. Since the inverse kinematic task for the 3-link arm involves a mapping from $R^2 \rightarrow R^3$, the input set consists of two input units representing the actual Cartesian (x,y) location of the end-effector. There are ten units on the hidden set. The output set consists of three units representing the desired joint angles. Since sigmoidal activation functions were chosen to have a dynamic range of [0,1], both the Cartesian coordinates and the joint angles used in the training set were properly normalized. The results of training the neural network on the inverse kinematic problem are summarized in FIG. 8. The number of training iterations required to learn the problem to a given precision is shown plotted. Prior to training, the synaptic weights and neuronal parameters were randomized. As can be seen from FIG. 8, the error decreases fairly rapidly after only a few hundred iterations. After training, the network was first tested on elements belonging to the training set. The network was prompted with uniformly distributed Cartesian end-effector coordinates taken from the training set and the three joint angle values, as computed by the neural network, were compared with the corresponding target angles. These results are shown in FIG. 9 for nine desired end-effector Cartesian points uniformly covering a subspace of the total available workspace. The desired or expected placement of the end-effector are shown as open circles. The actual end-effector placement as given by the neurally calculated joint coordinates are shown as solid black circles. As can be seen, the solid circles overlap the open circles to a great degree of precision. Performance over the remaining available workspace was identical. Since we require that the network be able to generalize beyond the training set and therefore learn the inverse kinematic transformation as opposed to memorizing the training set, the network was tested over uniformly distributed points covering the workspace that were not elements of the training set. These results are summarized in FIG. 10. As before, 20 points from within the same workspace subspace as tested in the previous figure were selected for clarity. Performance over the remaining region was identical. Again, desired end-effector placement are shown as open circles whereas actual end-effector placement are shown as solid circles. In this figure one observes some very minor discrepancies between the registering of the open and solid circles. However, it is evident that the neural network has captured the underlying nonlinear inverse kinematic transformation, and that the network is performing some form of interpolation approximation for points that are not elements of the training set. For completeness, the network was prompted on points outside the training workspace boundary. In this instance, the positioning accuracy of the end-effector degraded gracefully but rapidly as one moved further and further from the boundary enveloping the training region. This indicates a form of limited extrapolation capability on the part of the network.

0.5 Trajectory Generation Problem

The trajectory generation problem is a higher order task in motion control hierarchy, and relies in part upon the solution of the inverse kinematics. The role of the trajectory planner in a robotic system is to determine the entire path of the arm from an initial position to some final position. Conventional approaches involve specifying a finite set of states of the manipulator along the desired trajectory. A state is a time independent description of the manipulator relative to the origin of the frame of reference. This includes the location and orientation of each joint on the arm. The role of the trajectory planner, therefore, is to complete the specification of the path by smoothly linking these states while at all times not violating constraints imposed by either the existence of obstacles in the workspace or un-physical arm configurations. Let us consider the motion of the end-effector. Again, we restrict the manipulator to motion in the plane. A trajectory specifies the path the end-effector is to follow in moving from an initial point, $(x_i, y_i)$, to some final $(x_f, y_f)$ point. A direct method of achieving this is by smoothly linking the trajectory's end-points by a path specified by some algebraic expression. If there are no constraints in the path, a straight line linking the two end points suffices. In the presence of obstacles, a special path described by some smooth polynomial function might be required. The robotic manipulator would be moved in the following manner. Starting from some initial position, the Cartesian coordinates would be incremented along the selected path and the inverse kinematic transformation would then be used to determine the corresponding joint angles. The joint actuators would then take care of the actual physical rotation/translation of the various links on the manipulator. This method relies upon repetitively solving the inverse kinematic equations along the whole path. Since these equations are very computationally expensive to solve by conventional approaches, the above method is not usually used. Conventional approaches rely on selectively solving the inverse kinematic equations at both end points of the trajectory as well as a few via points on the trajectory. This constraint is non-existent however in the neuromorphic approach outlined in the previous section, since there is no computational burden involved in obtaining solutions to the inverse kinematic equations in real time. Let the trajectory be specified by the function f, which is a function of the initial end-effector position and the time variable. This is given by $$(x,y) = (f_x(x_i, y_i, t), f_y(x_i, y_i, t)) \tag{42}$$

Figure 11:
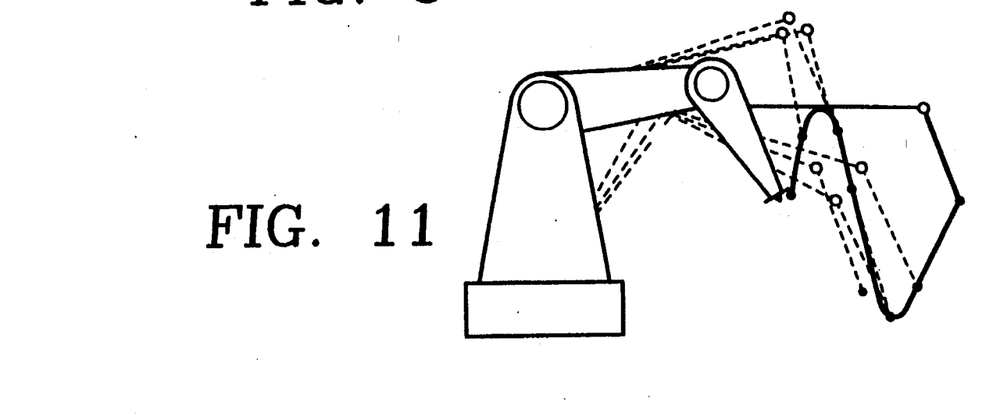
FIG. 11 illustrates planned versus actual paths using a trajectory generation method in carrying out the invention.

A trajectory is generated by incrementing the time variable t by an amount $\Delta t$. New x-y coordinates of the end-effector are obtained upon substitution in the above expression. These new cartesian coordinates are then fed to the neural network which is trained on the inverse kinematic problem. In this fashion, we can generate the incrementally changed joint angles. FIG. 11 shows such a trajectory. The end-points for this trajectory are at (0.3, 0.2) and (0.5, 0.2). The trajectory that was selected to link these end-points was a sine wave. The figure compares the performance of the planned versus actual response of the neural network. The desired sine wave is shown as a solid line linking the end-points. The performance of the robotic manipulator at various points along the sine wave are shown as solid filled circles. The arm posture at these points is shown as a set of dotted linkages. There are very small discrepancies between the desired and actual end-effector positioning.

Hardware Implementation

Figure 12:
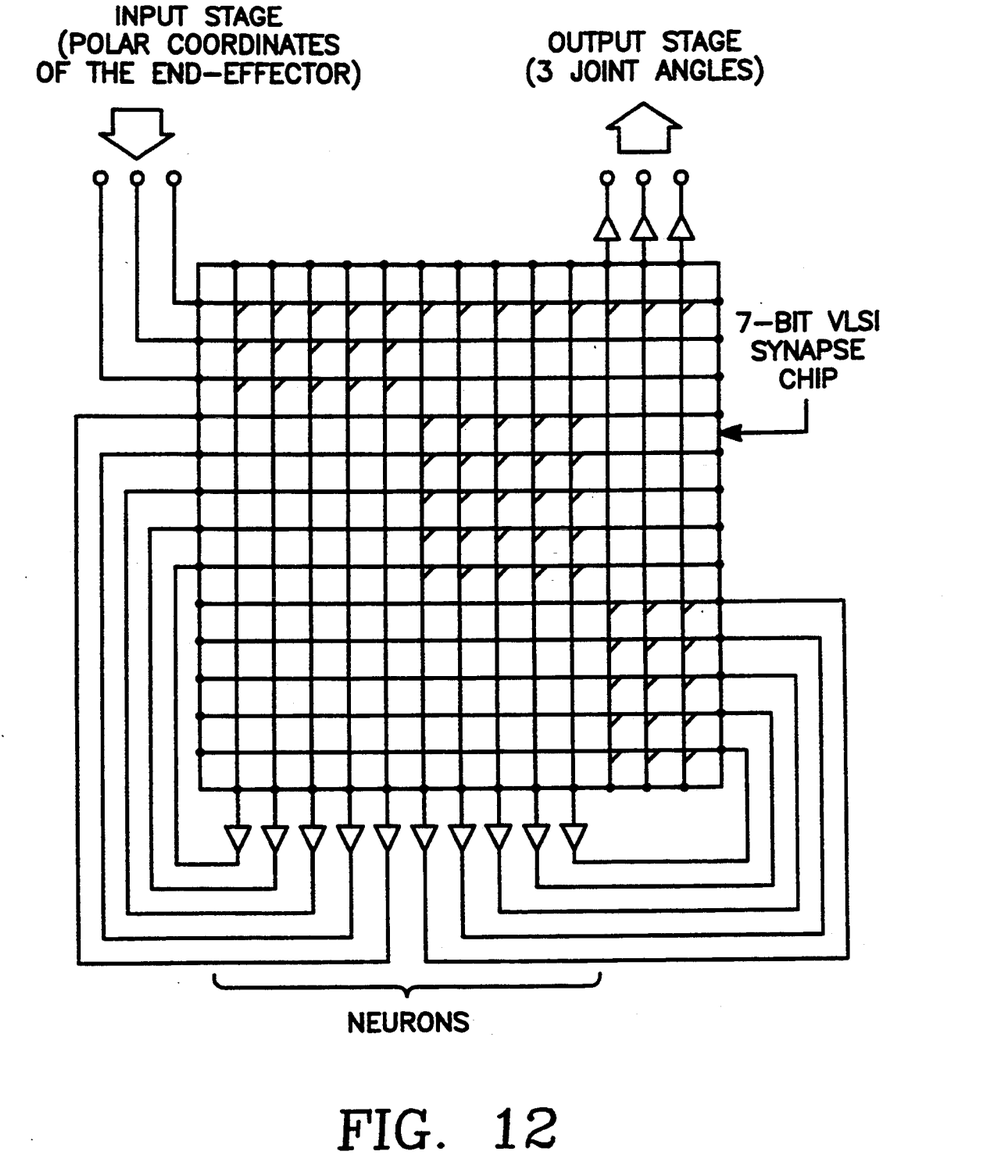
FIG. 12 is a block diagram of a feed forward neural network hardware implementation embodying the invention.
Figure 13:
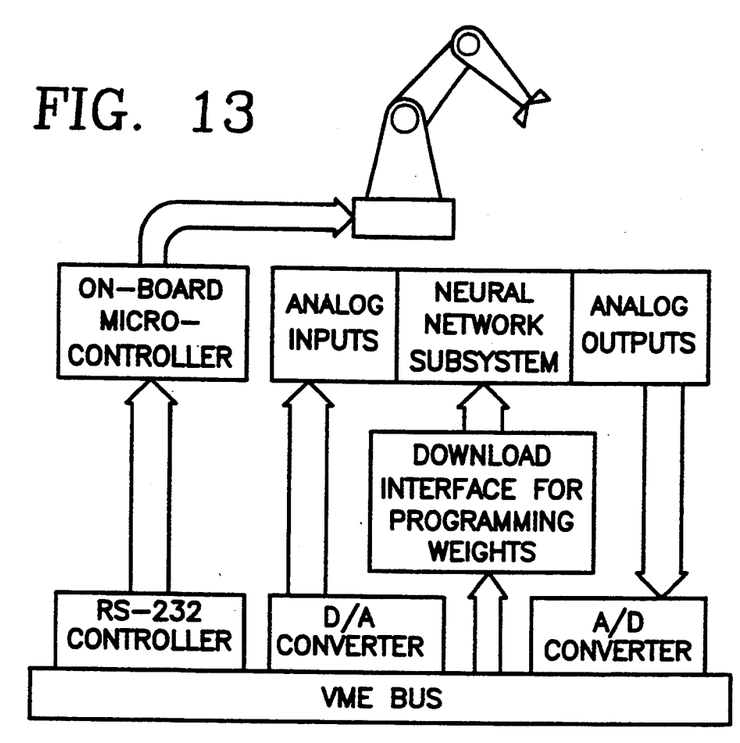
FIG. 13 is a schematic diagram of a robotic controller emulated by the invention.

In this section, we describe the electronic implementation of a feed-forward neuroprocessor using custom CMOS analog synaptic and neuronal chips developed at JPL. These chips were fabricated through MOSIS with a 2 μm feature size. The synaptic chip is organized as a 32×32 crossbar configuration of synaptic cells. Each such synaptic cell has 7-bits of resolution, i.e. 128 levels of quantization split up into two groups of 64 levels—an excitatory and an inhibitory group. Technical details of this chip may be found in A. Moopenn et al., "Digital Analog Hybrid Neural Network Simulator: A Design Aid for Custom VLSI Neurochips," *Proceedings of the SPIE Conference on High Speed Computing,* 1989, Los Angeles, Calif. The neuron chip is organized as a 1×36 linear array of variable gain neurons. Using these neural network building block chips, a feed-forward neuroprocessor was implemented in hardware. A feed-forward structure was utilized rather than a fully recurrent structure for ease of electronic implementation. This feed-forward structure consisted of 2 input units, two hidden layers of 5 units each, and an output layer of 3 units. FIG. 12 shows a block diagram of such an electronic network. It uses a single variable gain neuron chip wired up to a single synaptic chip to obtain the desired 2-5-5-3 layered neural network architecture. This configuration allows layered structures to be implemented by electronically carving out synaptic blocks of the appropriate dimension. Neuronal outputs from a given layer are fed back onto unused synaptic elements on the chip. In FIG. 12, the input stage of the 2-5-5-3 neuron architecture is shown on the upper left hand side. There are three inputs shown. The topmost input is the common input bias to neurons on all layers. Analog voltages representing the normalized x-y Cartesian coordinates are fed into the remaining two inputs. Neurons in the first hidden layer are shown in the lower left hand side of the chip, and connect with the input signals via the upper left hand 3×5 bank of synaptic cells. The output of the neurons folds back onto an unused 5×5 bank of synaptic cells, shown in the central part of the chip. The output of these cells feed into the second layer of 5 hidden neurons. These neurons fold back in a similar manner onto an unused 5×3 bank of cells from which an output signal is derived after passing through the final layer of hidden neurons. The voltages appearing on the outputs of these three neurons represent the three scaled joint angles. It is these two inputs and three outputs that interface to the outside world.

Figure 14:
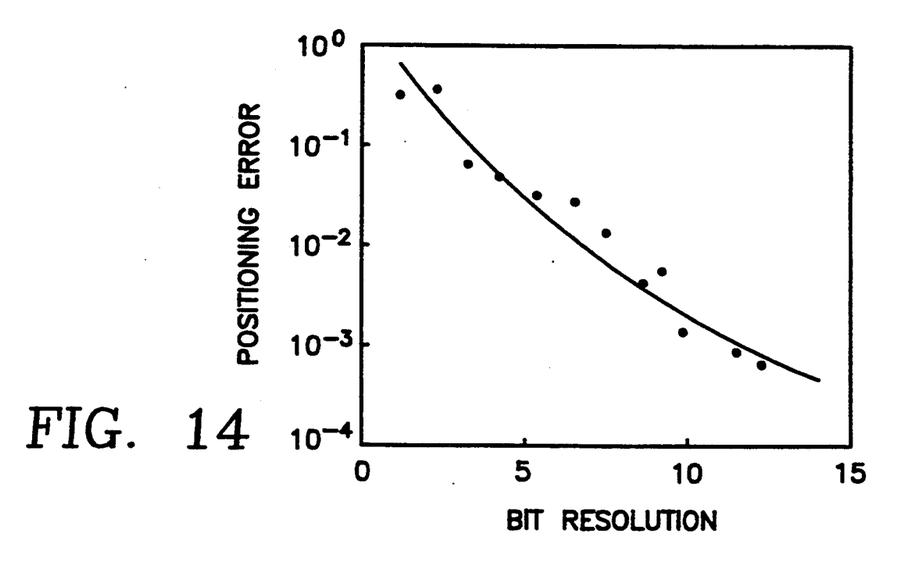
FIG. 14 is a graph illustrating end effector positioning accuracy as a function of weight quantization in carrying out the invention.

Overall, the hardware consisted of one synapse chip and one neuron chip and support circuitry wire-wrapped onto a VME-bus prototype card. This is shown schematically in FIG. 14. The downloader circuit comprised of a digital memory of weight values, a counter for accessing each memory location and each corresponding synapse in turn and some control logic for programming the selected synapse with its corresponding weight. A Compaq computer was programmed with a master control routine, with which arbitrary feedforward network architectures could be mapped onto the hardware as described above. Boards with 8 channel search of 12-bit digital-to-analog and analog-to-digital converters were used to program and read network inputs and outputs, and a serial line with an efficient transfer protocol was used to program the network by way of a 6800-based VME bus controller. Consequently, architectures with up to 8 inputs and outputs, and 22 hidden units distributed among up to 8 hidden layers, could be implemented. A VME-based RS-232 controller card acted as the necessary interface between the neuroprocessor and the microprocessor on-board the robotic arm. Since the computer simulations of the inverse kinematic problem made full use of analog synaptic weight values, and since the synaptic hardware can only support limited quantization, the impact of finite synaptic weights on end-effector positioning accuracy was assessed. On completion of training, the synaptic weights $w_{ij}$ on all layers were observed to be bound. This range was given as $-4.5 \leq w_{ij} \leq +4.5$. In FIG. 14, the end-effector positioning accuracy is shown plotted as a function of the levels of quantization of the synaptic weights. This data was generated by discretizing the analog weights as a function of the n-bit weight precision, where n ranged from 1 to 12. The positioning error, defined by:

$$\text{Error} = \frac{1}{N} \sum_{p=1}^{N} ((x - x_0)^2 + (y - y_0)^2)^{\frac{1}{2}} \tag{43}$$

is an average over N Cartesian points of the euclidian distance between the end-effector position as given by analog synapses $(x_0, y_0)$ and one as given by quantized synapses $(x,y)$. The minimum resolution required is application sensitive. This could range from 4 to 12 bit resolution, depending on the end-effector positioning tolerances. In real world terms, an arm with a 1.0 m extension radius would reach it's target within 1 cm for 7 bit resolution, or within 0.6 mm for 12 bit resolution.

Updating Algorithm

Figure 15:
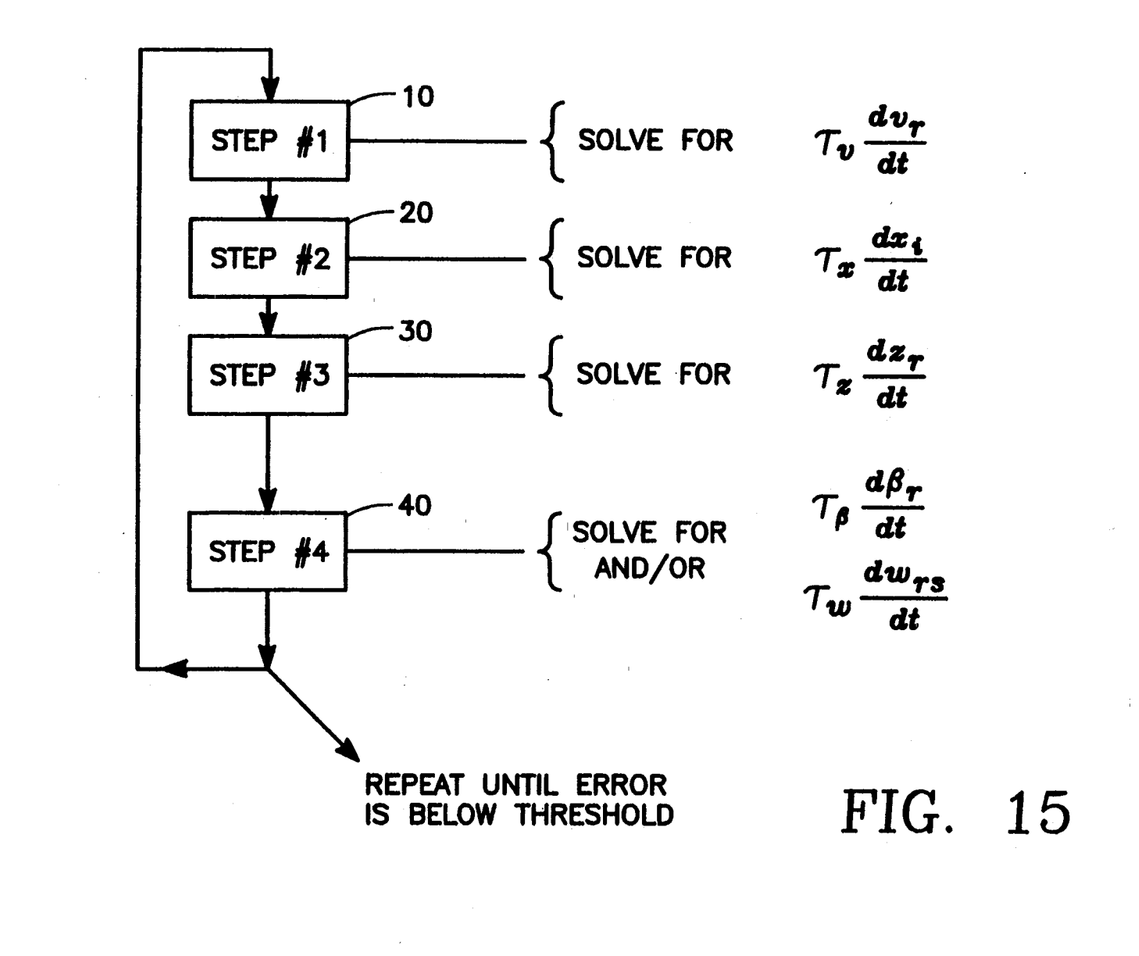
FIG. 15 is a flow diagram illustrating the algorithm for continuously updating neuron temperatures and synapse weights in accordance with the invention.

Referring to FIG. 15, the algorithm for updating the neuron temperatures and synpase weights during training begins by solving Equation 28 for $v_r$ (block 10 of FIG. 15). Then, Equation 24 is solved for $x_i$ (block 20 of FIG. 15). Next, Equation 26 is solved for $z_r$ (block 30 of FIG. 15). Then, Equations 25 and 27 are solved for $\beta_r$ and $w_{rs}$, respectively. These equations are solved in ascending order of their time constants $\tau$, so that the quantities having the least relaxation times are solved for first and more frequently than quantities having greater relaxation times. The results of the solution of the previous equation are employed in solving the next equation.

The time constants are selected to optimize a particular problem being solved by the neural network. For example, if the problem is that of classification, then $\tau_\beta$ is shorter than $\tau_w$, while the reverse is true if the problem is one of a continuous mapping relation.

Conclusions

In this specification, we have developed the Adaptive Neuron Model for learning in fully recurrent neural network architectures. The fundamental idea behind this model was to actively involve the neuron processing elements in the learning procedure. Prior approaches have regarded the neurons as passive nonlinear processing elements and the synapses as the only source of information retention. In the ANM model, the functional nature of the neuron response function is non-critical for the mathematical developments. However, the only requirements of the model is that the neuron response function be parametrized by a local parameter(s) (such as the temperature $\beta_i$ in the derivation above) and be continuously differentiable in that parameter(s). This formalism has been shown to be extremely effective in reducing the training times on a variety of learning problems. Because of the ANM's ability to rapidly learn complex nonlinear transformations, it was trained on the inverse kinematic problem.

The algorithm was benchmarked on this supervised learning task and demonstrated an order of magnitude faster training time than an identical algorithm with the adaptive neuron feature disabled. Specifically, the ANM model was applied and trained from examples on the degenerate inverse kinematic problem in robotic control. The model was shown to rapidly capture the inverse transformation embedded within the training set.

We have also implemented the feed forward neural network architecture for the inverse kinematic and trajectory generation problems in hardware. This consisted in interfacing custom VLSI synaptic chips with variable gain neuron chips developed at JPL so as to form a neuroprocessor. The synaptic chip is arranged in a 32×32 cross-bar design and offers 7 bits of dynamic range or resolution. The simulated synaptic weights were down-loaded onto the hardware and the neuroprocessor was used for the real time control of a manipulator. Results indicate that these problems can indeed be down-loaded from simulation to hardware at the cost of some loss in accuracy. For the robotic problem, there is a finite degradation in positioning accuracy over the simulation results. Improved positioning accuracy can be achieved by tweeking the synaptic weights once downloaded with chip-in-the-loop learning.

While the invention has been described with specific reference to preferred embodiments thereof, it is understood that variations and modifications may be made without departing from the true spirit and scope of the invention.

We claim:

1. A method of training an analog neural network comprising plural neurons and synapses wherein said neurons are connected together by respective synapses, said neurons comprising respective activity states and adjustable neuron temperatures, said synapses comprising adjustable synapse weights, said method comprising the steps of:

defining, relative to an error between activity states of a set of output neurons and a predetermined training vector, predetermined time-dependent behaviors of: (a) said activity states, (b) said neuron temperatures in accordance with a gradient descent of said error in temperature space and (c) said synapse weights in accordance with a gradient descent of said error in weight space, said behaviors governed by (a) an activity state relaxation time, (b) a neuron temperature relaxation time and (c) a synapse weight relaxation time, respectively;

continuously updating said neuron activity states, said neuron temperatures and said synapse weights of said analog neural network at respective rates corresponding to said relaxation times until said error is reduced below a predetermined threshold.

2. The method of claim 1 wherein said activity state relaxation time is shorter than said neuron temperature relaxation time and shorter than said synapse weight relaxation time, whereby for a given set of values of said neuron temperatures and synapse weights, said neuron activity states equilibrate before changes in said set of values occur.

3. The method of claim 2 wherein:

said behavior of said activity states is an activity state differential equation for each neuron governing a time derivative of a corresponding activity state in terms of a product of a corresponding neuron temperature multiplied by a sum of products of corresponding ones of said synapse weights and corresponding ones of said activity states; and said continuously updating comprises solving said activity state differential equation for said activity state repetitively at a rate corresponding to said activity state relaxation time.

4. The method of claim 3 wherein:

said behavior of said neuron temperatures is a temperature differential equation for each neuron defining a time derivative of a corresponding neuron temperature as a product of an exponential function of said neuron temperature and said error between activity states of the set of output neurons and the predetermined training vector transformed by a matrix of said synapse weights; and said continuously updating step further comprises solving said temperature differential equation for said neuron temperature repetitively at a rate corresponding to said temperature relaxation time.

5. The method of claim 4 wherein:

said behavior of said synapse weights is a weight differential equation for each synapse defining a time derivative of a corresponding synapse weight as a product of an exponential function of the corresponding neuron temperature and a sum of products of said synapse weights; and said continuously updating step further comprises solving said weight differential equation for said synapse weight repetitively at a rate corresponding to said weight relaxation time.

6. The method of claim 5 wherein said activity state differential equation, temperature differential equation, and weight differential equation are solved in an ascending order associated with an order of ascending relaxation times, such that a result of a solving of a preceding differential equation in the ascending order is employed in solving a next differential equation in the ascending order.

7. The method of claim 1 wherein said neural network is a fully recurrent neural network.

8. The method of claim 1 wherein said predetermined training vector corresponds to a classification problem and said temperature relaxation time is shorter than said weight relaxation time.

9. The method of claim 1 wherein said predetermined training vector corresponds to a continuous mapping relation, and said weight relaxation time is shorter than said temperature relaxation time.

10. Apparatus for training an analog neural network comprising plural neurons and synapses wherein said neurons are connected together by respective synapses, said neurons comprising respective activity states and adjustable neuron temperatures, said synapses comprising adjustable synapse weights, said apparatus comprising:

means for defining and storing, relative to an error between activity states of a set of output neurons and a predetermined training vector, predetermined time-dependent behaviors of: (a) said activity states, (b) said neuron temperatures in accordance with a gradient descent of said error in temperature space and (c) said synapse weights in accordance with a gradient descent of said error in weight space, said behaviors governed by (a) an activity state relaxation time, (b) a neuron temperature relaxation time and (c) a synapse weight relaxation time, respectively;

means for continuously updating said neuron activity states, said neuron temperatures and said synapse weights of said analog neural network at respective rates corresponding to said relaxation times until said error is reduced below a predetermined threshold.

11. The apparatus of claim 10 wherein said activity state relaxation time is shorter than said neuron temperature relaxation time and shorter than said synapse weight relaxation time, whereby for a given set of values of said neuron temperatures and synapse weights, said neuron activity states equilibrate before changes in said set of values occur.

12. The apparatus of claim 10 wherein:
said behavior of said activity states is an activity state differential equation for each neuron governing a time derivative of a corresponding activity state in terms of a product of a corresponding neuron temperature multiplied by a sum of products of corresponding ones of said synapse weights and corresponding ones of said activity states; and
said means for continuously updating comprises means for solving said activity state differential equation for said activity state repetitively at a rate corresponding to activity state relaxation time.

13. The apparatus of claim 12 wherein:
said behavior of said neuron temperatures is a temperature differential equation for each neuron governing a time derivative of a corresponding neuron temperature as a product of an exponential function of said neuron temperature and said error between activity states of the set of output neurons and the predetermined training vector transformed by a matrix of said synapse weights; and said means for continuously updating further comprises means for solving said temperature differential equation for said neuron temperature repetitively at a rate corresponding to said temperature relaxation time.

14. The apparatus of claim 13 wherein:
said behavior of said synapse weights is a weight differential equation for each synapse defining a time derivative of a corresponding synapse weight as a product of an exponential function of the corresponding neuron temperature and a sum of products of said synapse weights; and
said means for continuously updating further comprises means for solving said weight differential equation for said synapse weight repetitively at a rate corresponding to said weight relaxation time.

15. The apparatus of claim 14 wherein said means for solving comprises means for solving said activity state differential equation, temperature differential equation, and weight differential equation in an ascending order associated with an order of ascending relaxation times, such that a result of a solving of a preceding differential equation in the ascending order is employed in solving a next differential equation in the ascending order.

16. The apparatus of claim 15 wherein said predetermined training vector corresponds to a classification problem and said temperature relaxation time is shorter than said weight relaxation time.

17. The apparatus of claim 15 wherein said predetermined training vector corresponds to a continuous mapping relation, and said weight relaxation time is shorter than said temperature relaxation time.

18. The method of claim 10 wherein said network is a fully recurrent neural network,

* * * * *